United States Patent [19]

Herpin

[11] 3,716,040
[45] Feb. 13, 1973

[54] FUEL ADDITIVE INDUCTOR FOR INTERNAL COMBUSTION ENGINE

[76] Inventor: Ivey Herpin, 110 No. Ira Ave., Dallas, Tex. 75211

[22] Filed: Aug. 21, 1970

[21] Appl. No.: 65,766

[52] U.S. Cl............123/198 A, 123/25 R, 123/25 C, 123/25 E, 123/134, 55/434, 261/124
[51] Int. Cl. .....................F02b 47/02, F02m 17/22
[58] Field of Search.........123/198 A, 25 C, 25 E, 25, 123/134; 137/592; 222/564, 464, 382, 195; 261/124, 122; 55/434, 257, 256, 255, 337; 248/65

[56] References Cited

UNITED STATES PATENTS

| | | | |
|---|---|---|---|
| 3,537,434 | 11/1970 | Herpin | 123/134 |
| 3,450,116 | 6/1969 | Knight et al. | 123/198 A |
| 1,391,899 | 9/1921 | Lynch | 261/124 |
| 3,038,454 | 6/1962 | Hundere | 123/198 A X |
| 3,081,239 | 3/1963 | Clauss et al. | 261/124 X |
| 1,977,360 | 10/1934 | Talbot | 222/382 |
| 2,058,752 | 10/1936 | Wray | 248/65 |
| 1,685,598 | 9/1928 | Davis | 123/198 A |
| 1,899,476 | 2/1933 | Paine | 123/25.4 |
| 3,535,853 | 10/1970 | Brown et al. | 55/337 |
| 1,708,587 | 4/1929 | Patterson | 123/25.4 |

FOREIGN PATENTS OR APPLICATIONS 672,332  12/1929  France .......................55/434

Primary Examiner—Wendell E. Burns
Attorney—Cecil L. Wood

[57] ABSTRACT

A device for containing a liquid fuel additive, such as a water-alcohol solution, which is vaporized and induced by vacuum into the fuel system of the internal combustion engine. The device includes a container for the liquid additive composition, having an adjustable vacuum controlled air intake valve for controlling the flow of air from a manifold within the liquid to produce the vapor carried to the engine. The air is filtered before entering the container, and a baffle device prevents the flow of liquid from the container outlet.

6 Claims, 10 Drawing Figures

PATENTED FEB 13 1973

INVENTOR.
Ivey Herpin
BY
Cecil L. Wood
ATTORNEY

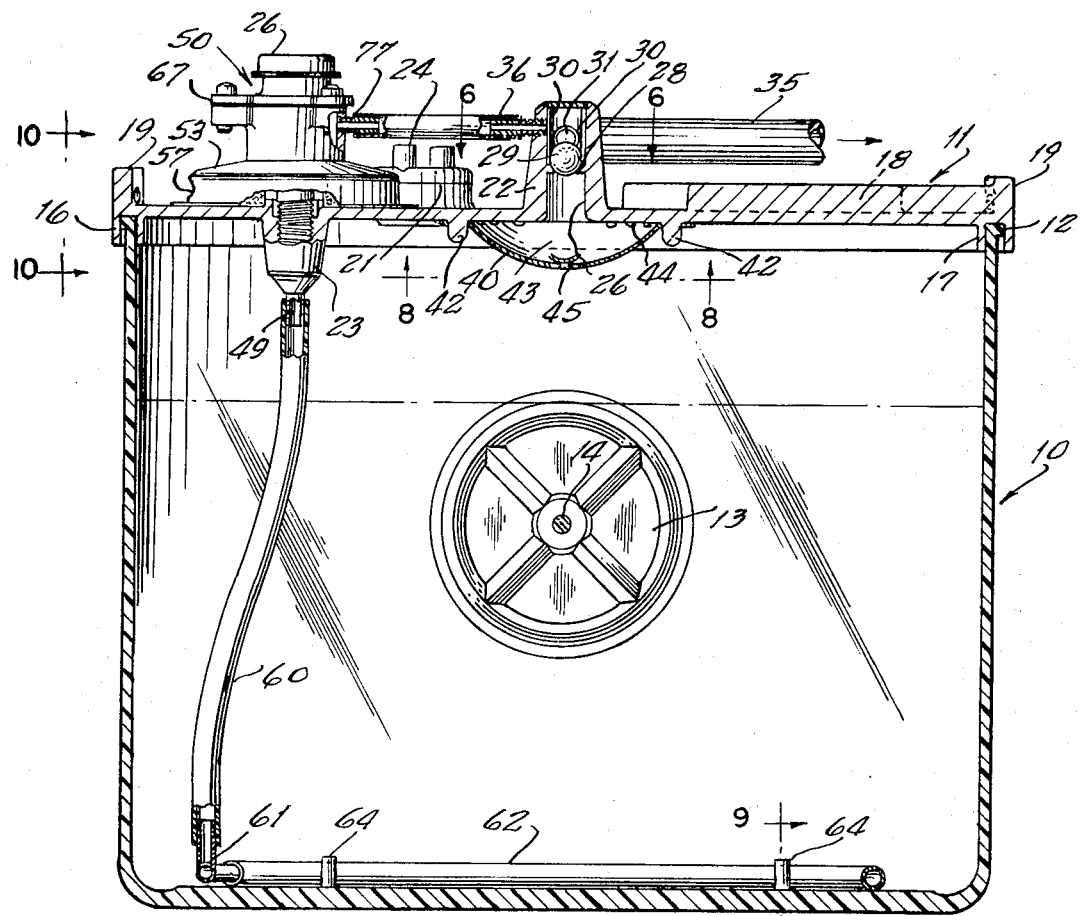
Fig. 3
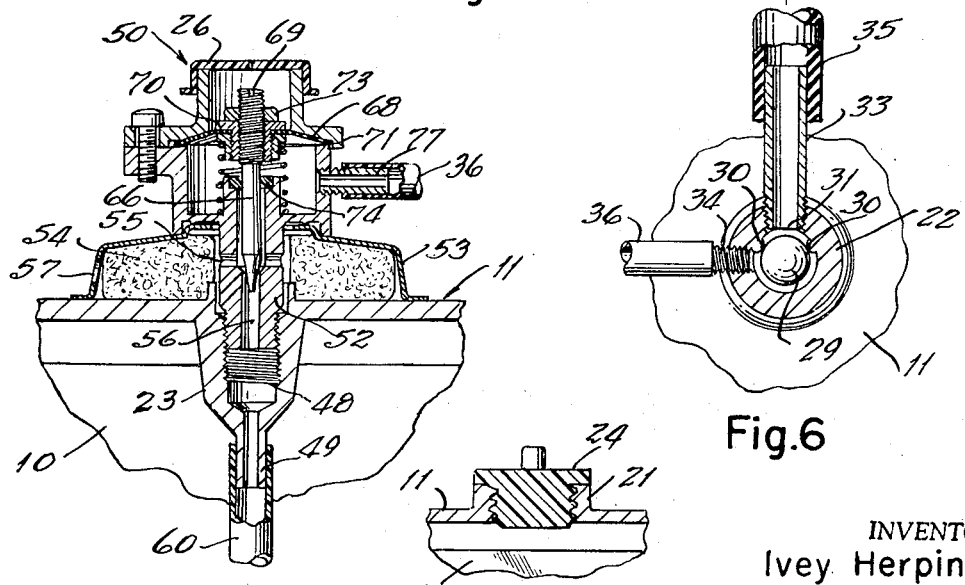
Fig. 5
Fig. 7
Fig. 6
INVENTOR.
Ivey Herpin

FUEL ADDITIVE INDUCTOR FOR INTERNAL COMBUSTION ENGINE

SUMMARY OF THE INVENTION

This invention relates to apparatus for inducting, by vacuum, a vaporized additive into the fuel system of an internal combustion engine, and has particular reference to automotive installations.

A prime object of the invention resides in the provision of apparatus which consists of a container for a fuel additive, such as a water-alcohol solution, having a closure in which an adjustable vacuum controled air intake valve is installed through which atmospheric air is admitted to an aerator in the container by which the contents are agitated to a vaporous state to be withdrawn by vacuum and inducted into the fuel system.

A further object of the invention is that of providing a simple and effective means of inducting an additive into the fuel system of a motor whereby to enhance the combustibility of the fuel, by lowering the flash point thereof, and to reduce waste due to incomplete combustion.

Still another object of the invention is that of providing a device by which water vapors, or any combination of water with soluble combustibles, can be inducted into the fuel system more effectively than conventional devices designed for such purpose which generally are lacking in effective vaporization of the additive elements and the most efficient control thereof whereby to insure a proper ratio between the carbureted fuel and additive vapors.

Broadly, the invention contemplates the provision of apparatus by which an additive can be vaporized and inducted into a fuel system by a vacuum, while controlling the volume thereof and preventing the flow of liquid additive to the engine.

The novel features of the invention, as well as additional objects and the advantages thereof, will be understood more fully from the following description when read in connection with the accompanying drawings, in which:

FIG. 3 is a vertical sectional view, taken on line 3—3 of FIG. 2, showing details of the inlet manifold and of the outlet passage and valve.

FIG. 5 is a fragmentary enlarged sectional view similar to that taken on line 3—3 of FIG. 2, showing details of the inlet valve assembly and including the inlet air filter.

FIG. 6 is a fragmentary sectional view, taken on line 6—6 of FIG. 3, showing details of the outlet passage and valve.

FIG. 7 is a fragmentary sectional view, taken on line 7—7 of FIG. 2, showing details of the filler plug.

Figure 1:
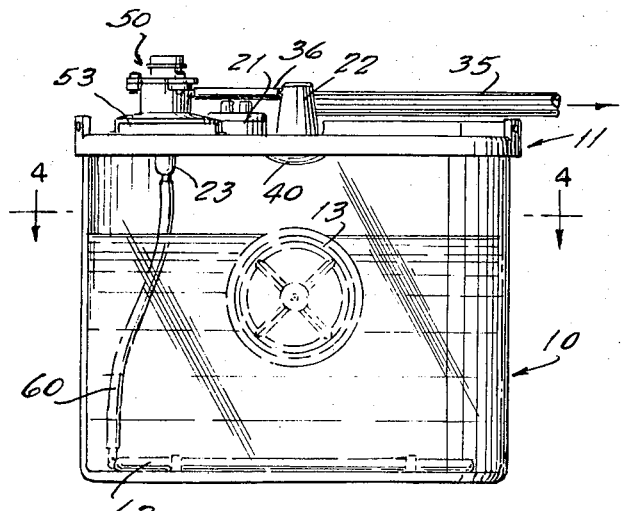
FIG. 1 is a side elevational view of a preferred form of inductor device according to the invention.

The inductor device illustrated in FIGS. 1 through 9 of the drawing is an improved form of the device disclosed in applicant's co-pending application under Ser. No. 787,938, filed Dec. 30, 1968, and entitled Vacuum Fuel Additive Inductor for Internal Combustion Engines.

Referring particularly to FIGS. 1 through 4 of the drawings, the improved device includes a container 10 having a closure or cover 11 defining a closed chamber for a liquid additive to be vaporized and inducted into the carburetor of the engine. The device would be suitably mounted, by means to be described, within the engine compartment of an automotive vehicle.

The container 10 is preferably fabricated of a plastic material, which is transparent for the purpose of observing the liquid level therein, but may be fabricated of glass or any other suitable material. As seen in the drawings, the container is laterally elongated including a flat-bottom wall, parallel side walls and rounded end walls. The upper edge of the container wall is formed with an outwardly extending lip 12 to define an upwardly facing edge surface wider than the thickness of the container wall.

Since the laterally elongated container is fabricated of plastic, as shown in the drawings, and since the container is to be subjected to a vacuum for negative pressure, it may be desirable to provide a brace to prevent the inward deflection of the confronting side walls of the container. A bracing assembly for this purpose includes two circular disc-like pads 13, which may be metal stampings and provided with suitable reinforcing ribs, and a transverse rod 14 seated in suitable central openings or recesses in the pads. The pads 13 are preferably cemented to the side walls to maintain the brace assembly at the appropriate locations on the confronting side walls.

Figure 2:
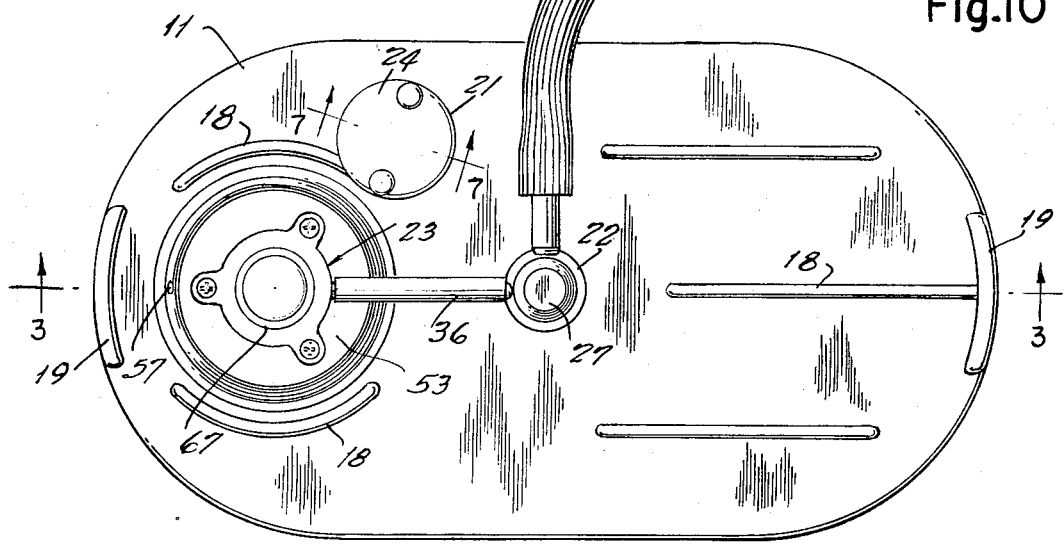
FIG. 2 is a top view of the device in FIG. 1.

As best seen in FIGS. 2 and 3, the cover or closure 11 is generally flat and is fabricated of a suitable metal. The edge wall of the cover includes a depending peripheral lip 16 which, with a depending rib 17, spaced inwardly therefrom, defines a peripheral groove dimensioned to receive the lip 12 of the container and in assembled relation, the lip 12 of the latter is preferably sealed within the cover groove with an epoxy resin, for example, to provide a closed sealed unit.

The upper surface of the cover 11 is formed with strengthening ribs 18 on its upper surface, and is further provided with arcuate mounting ribs 19 at either end thereof for the purpose of mounting the container-closure assembly within the vehicle by means of suitable brackets.

A boss 21 is formed about a filler opening in the cover 11 and providing a seat for a threaded filler plug 24 fabricated of a suitable plastic material. A substantially conical boss 22 provides an outlet opening for the additive vapor and a housing for a relief valve, and a boss 23 depends from the cover 11 and provides an inlet opening to the container 10 and houses the inlet valve assembly as will be presently described.

The container outlet opening defined by the boss 22 and associated structure is best seen in FIGS. 2, 3, 6 and 8. The boss 22 extends upwardly from the cover and includes a vertical passage 26 therethrough, which is sealed at the top by means of a suitable cap 27. Intermediate the ends of the passage 26 is provided an inwardly extending radial rib 28 defining a seat for a ball valve 29 which is normally seated by gravity to prevent fluid flow through the passage 26 in a downward direction. Above the seat 28, the wall of the passage 26 is provided with two angularly spaced longitudinal ribs 30 for the purpose of preventing the ball valve 29 from closing the outlet opening 31.

Above the valve seat 28 within the passage 26 are provided two right-angularly disposed threaded ports to receive fittings 33 and 34 for attaching external conduits for communication with the passage 26. As best seen in FIG. 6, a flexible tube 35 is connected at one end to the fitting 33 secured in the outlet opening 21, the opposite end of which is connected to suction fitting of the engine carburetor. Another flexible conduit 36 is connected at one end to the fitting 34, and the other end is arranged for attachment to the inlet valve assembly which will be presently described.

Figure 8:
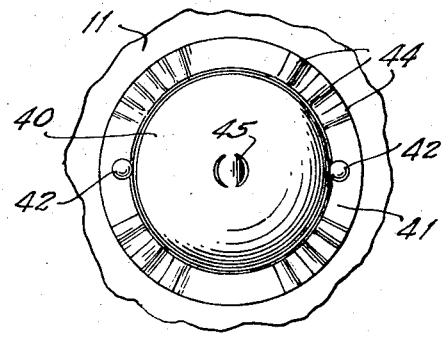
FIG. 8 is a fragmentary view of the baffle for the outlet passage as viewed along the line 8—8 of FIG. 3.
Figure 10:
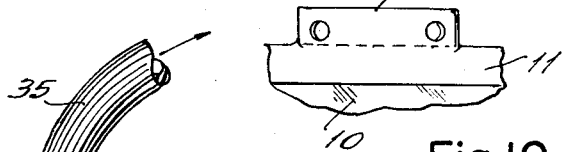
FIG. 10 is a fragmentary view of the container mounting ribs as viewed along the line 10—10 of FIG. 3.

As best seen in FIGS. 3 and 8, a baffle 40 covers and protects the lower opening of the outlet passage 26 from the ingress of liquid additive during movement of the vehicle on which the inductor unit is mounted. The baffle 40 is a shallow dish-like member, fabricated of a suitable metal for example, including a peripheral radial flange 41 which is provided with suitable openings to receive, with a friction fit, a plurality of depending bosses 42 on the cover 11 for securing the baffle to the under surface thereof. In assembled relation, the flange 41 lies contiguous to the under surface of the cover, and the baffle and cover defines a baffle chamber 43 immediately below the outlet passage 26.

The flange 41 is formed with radial corrugations 44 which may extend partially or completely around the periphery of the baffle and which define, with the under surface of the cover, radial passages providing communication between the baffle chamber 43 and the main chamber of the container. It is through these radial passages that the additive vapors flow from the upper portion of the main container chamber into the baffle chamber 43 and the passage 26. Openings or slots 45 are provided in the lowermost portion of the concavo-convex baffle, to permit the draining back into the container 10 of any liquid which may accumulate within the baffle chamber 43 due to condensation or for any other reason. The openings 45 are formed to minimize any direct flow opening between the main container chamber and the passage 26 and to deflect any liquid which may tend to enter the baffle chamber through these openings away from the opening of the passage 26.

The boss 23 depends from the cover 11 defining an inlet passage 48 through the cover with the upper portion of the passage defining a threaded recess for securing the inlet valve assembly. The lower portion of the boss defines a hollow stem 49 to which is connected a manifold assembly to be described.

An inlet valve assembly 50, shown in detail in FIG. 5, includes a cylindrical housing 51 having a depending hollow stem 52 which is externally threaded to be coupled within the internally threaded recess of the inlet passage 48. When the valve assembly is coupled to the cover 11, a cup-shaped housing 53, having a central opening to accommodate the hollow stem 52, is clamped in inverted relation between the cylindrical housing 51 and the upper surface of the cover 11. In assembled relation, the housing 53 is clamped in sealed relation with the surface of the cover 11 and with the surface of the cylindrical housing 51 to define a sealed chamber enclosing a suitable air filtering material 54 surrounding the hollow stem 52.

The stem 52 is provided with one or more radial passages 55 providing communication between the passage 56 of the stem 52 and the filter housing 53, the latter having at least one peripheral inlet port 57. As a result of the vacuum created within the container 10, the air flows thereinto through the inlet port 57, the filter material 54, the radial passages 55 and central passages 56 of the stem 52, and the inlet passage 48.

Figure 4:
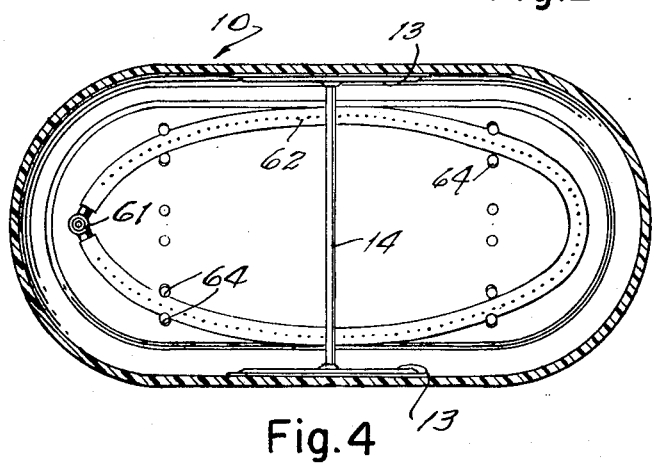
FIG. 4 is a transverse sectional view, taken on line 4—4 of FIG. 1, showing details of the inlet manifold and of the container wall brace.
Figure 9:
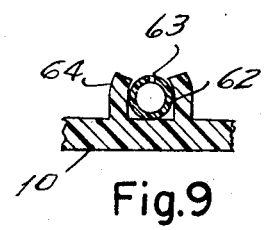
FIG. 9 is a fragmentary sectional view, taken on line 9—9 of FIG. 3, showing the retaining bosses for the manifold tubing.

In FIGS. 3, 4 and 5, is shown a manifold assembly which includes a flexible tube 60 attached to the lower end of the hollow boss stem 49, and connected at its lower end through a T-fitting 61 to an oval shaped manifold 62 which is secured contiguous to the bottom wall of the container 10. The manifold 62 is preferably formed of a flexible tubing, which is provided with a series of orifices 63 through which the air entering through the valve assembly 50 is discharged upwardly through the liquid contents in the container 10 and emerges as a vapor in the upper portion of the container. The manifold is retained on the container bottom by pairs of contiguous upwardly extending bosses 64 which are spaced apart relative to the external dimensions of the manifold tubing to frictionally engage and retain the latter.

To control the flow of air entering the container chamber, a valve needle 66 is supported within the stem passage 56 to regulate the amount of air entering the passage from the radial passages 55. The cylindrical housing 51 of the valve assembly 50 is closed by a cap 67 secured in place by a plurality of screws arranged through ears formed on the cap 67 and the upper perimeter of the housing 51, as best shown in FIGS. 2 and 5. The needle 66 is arranged concentrically of the housing 51 through a diaphragm 68 which is clamped between the housing 51 and the cap 67. The needle has a threaded portion 69 at its upper end which is threaded through a flanged collar 70 and secured by a nut 71 thereunder threaded onto the collar 70.

A coil spring 72, compressed between the bottom wall of the cylindrical housing 51 and the nut 71, urges the diaphragm 68 into an upper limiting position against the cap 67. The upper end of the needle is provided with a screwdriver slot whereby the needle may be adjusted vertically relative to the collar 70 to position the lower end of the needle relative to the seat defined in the stem passage 56 adjacent to the passages 55, the needle being secured in adjusted positions by a lock nut 73. A close fitting gasket 74 is seated in an annular recess in the upper portion of the stem 52 and embraces the needle 66 to seal the valve assembly vacuum chamber from the remainder of the stem passage 56.

Vertical movement of the valve needle 66 is effected by the coaction of the negative or vacuum pressure within the valve assembly vacuum chamber, the atmospheric pressure acting on the upper surface of the diaphragm 68 and the upward force exerted on the diaphragm by the spring 72. The valve assembly cap 67 is open at the top to expose the upper surface of the diaphragm to atmospheric air, and to permit access to the top of the valve needle 66 for manual adjustment. The cap may be closed by a suitable plastic cover 76 provided with suitable ports for maintaining atmospheric pressure at the upper surface of the diaphragm.

To produce vacuum within the valve assembly vacuum chamber, the wall of the cylindrical housing 51 is provided with a threaded opening for receiving a fitting 77 to which the flexible tubing 36 is attached.

OPERATION

In operation, atmospheric air is drawn into the container chamber by the suction created in the engine carburetor upon the downstroke of the pistons of the vehicle engine. A vacuum is thereby created in the tube 35 which is connected to the carburetor, and a vacuum is in turn created within the container chamber as a result of air flowing past the ball valve 29, which lifts from its seat 28, and a vacuum is created within the valve assembly vacuum chamber through the tube 36.

The valve needle 66 is normally urged to its uppermost position within the valve assembly 50 to permit maximum flow of air through the filter housing 53 and through the manifold 62 to effect the vaporization of the additive liquid within the container 10. The additive vapor collects at the upper portion of the chamber to be drawn into the baffle chamber 43 principally through the radial passages defined by the corrugation 44 and the vapor is drawn through the passage 26 past the ball valve 29 which is lifted from its seat 28 by the vapor flow. The vapor is then drawn into the carburetor through the tube 35 for mixture with the fuel-air mixture within the carburetor.

As the vacuum within the valve assembly vacuum chamber increases, the diaphragm 68 is caused to move downard thereby restricting the flow area between the valve needle 66 and the associated valve seat and reducing the flow of air into the container. When the vacuum is reduced, due to acceleration for example, the valve needle 66 lifts to increase the flow of air into the container and thereby increases the production of additive vapor available to the engine.

The ball valve 29 acts as a check valve to prevent excessive pressure build-up within the container chamber. An excessive pressure build-up, such as might be caused by a backfire for example, may rupture the container or break the seal between the container lip 12 and the cover 11. Other less drastic pressure build-ups, but for the check valve 29, would reduce or neutralize the vacuum pressure within the container resulting in inefficiency of the unit.

A feature of the invention is the provision of the baffle means for preventing the additive liquid in the container from flowing into the passage 26 and thereby choking the passage and reducing the effectiveness of the vapor inductor.

Another feature of the invention is the improved inlet valve and filter assembly whereby the filter housing is essentially an integral part of the valve assembly providing for efficient operation of the unit.

Another feature of the invention is the provision of retaining means integral with the container bottom wall for maintaining the vaporizing manifold in the desired relation contiguous to the container bottom wall.

Although the invention has been described with reference to a particular preferred embodiment, changes and modifications will become apparent to those skilled in the art in view of the foregoing description which is intended to be illustrative and not limiting of the invention defined in the claims.

What is claimed is:

1. An inductor for vaporous fuel additives for internal combustion engines having a fuel reservoir and a carburetor, the combination comprising:

a container for a liquid fuel additive and a cover for sealing the container;

a valve assembly, including a vacuum chamber means, and including a hollow stem arranged to be secured in an opening in said cover for communication with the interior of said container; a ported seat in said stem, below said vacuum chamber, open to atmosphere;

a manifold disposed adjacent to the bottom of said container to be submerged in the liquid contained therein, and connected to said hollow stem; said manifold having a series of outlet orifices therein whereby to vaporize the liquid in said container by the passage of air therethrough;

a needle in said vacuum chamber extending into said hollow stem and operable with respect to said ported seat; a spring biased diaphragm carrying said needle in said vacuum chamber, for actuating said needle with respect to said ported seat;

a vapor outlet passage in said cover opening to the inner wall surface thereof; baffle means on said cover inner wall surface overlying said passage opening, shielding said vapor outlet passage opening from the ingress of the liquid contained in said container; said baffle means comprising a dish-shaped member having a peripheral radial flange disposed contiguous to the cover wall surface surrounding said passage; said cover and said dish-shaped member having coacting means for readily attaching said member to said cover; said member and said cover defining a chamber directly beneath said outlet passage; said peripheral flange being corrugated to define radial passages communicating said baffle chamber with the container; said dish-shaped member having an opening for draining liquid back to the container:

and a suction tube for connecting said vapor outlet passage and said vacuum chamber to the engine carburetor whereby to conduct vapor to said carburetor and to actuate said diaphragm and said needle.

2. An inductor device as set forth in claim 1 including an annular housing member coacting with said cover and said valve assembly to define an annular chamber surrounding said stem; said ported seat opening to said annular chamber; inlet port means in a wall of said annular chamber housing member; and filter means disposed in said annular chamber between said inlet port means and the ports of said ported seat.

3. An inductor device as set forth in claim 2 wherein said hollow stem is provided with external threads for threaded engagement with an internally threaded opening in said cover; and wherein said annular housing member is defined by a cup-shaped member clamped between said valve assembly and said cover to define said annular chamber.

4. An inductor device as set forth in claim 1 wherein said manifold is formed of flexible tubing and wherein the bottom wall of said container includes integral bosses extending upwardly therefrom in spaced relation to frictionally engage and retain said tubing.

5. An inductor device as set forth in claim 3 wherein said housing member is fabricated of a thin walled resilient material; and wherein said valve assembly includes a shoulder confronting the adjacent cover surface for engaging the upper periphery of said housing member.

6. An inductor device as set forth in claim 1 including check valve means in said outlet passage for preventing reverse flow into said container.

* * * * *